May 2, 1950     S. T. GROSS     2,506,080
ELECTRON DIFFRACTION APPARATUS
Filed Nov. 15, 1947
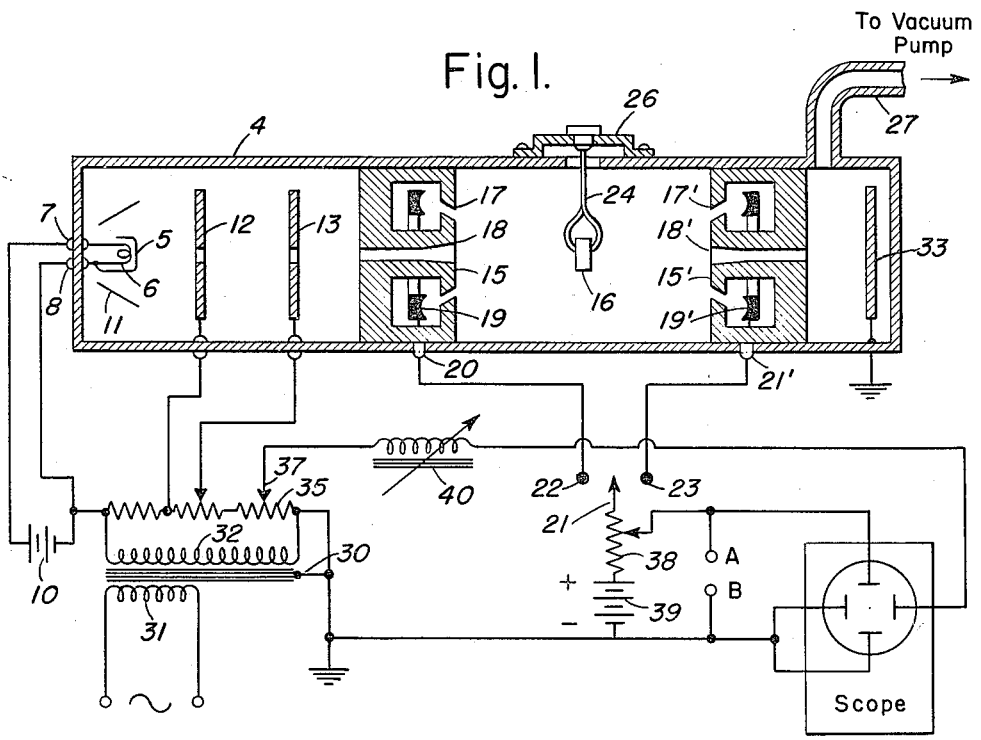
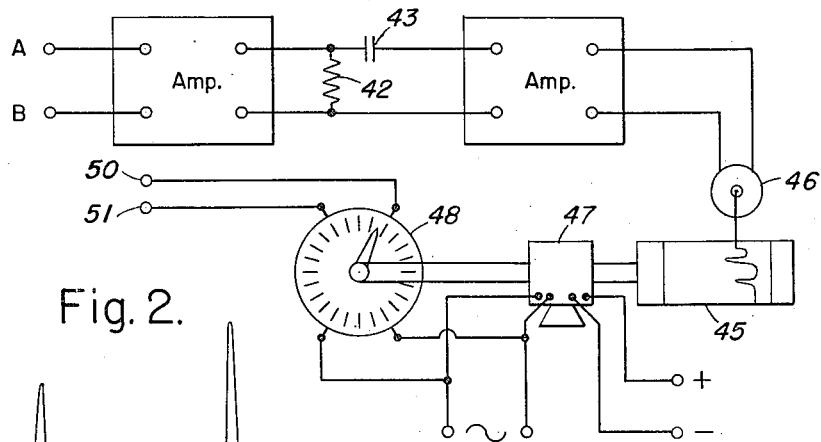
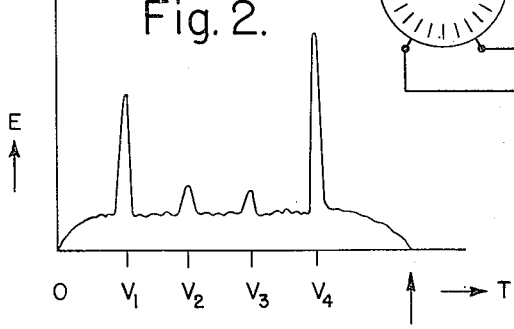
INVENTOR
Siegfried T. Gross Patented May 2, 1950

2,506,080

UNITED STATES PATENT OFFICE 2,506,080

ELECTRON DIFFRACTION APPARATUS

Siegfried T. Gross, Easton, Pa., assignor to General Aniline & Film Corporation, New York, N. Y., a corporation of Delaware Application November 15, 1947, Serial No. 786,283

11 Claims. (Cl. 250—49.5)

This invention relates to diffraction analyzing systems and more particularly to diffraction apparatus utilizing a beam of electrons as the medium for obtaining diffraction patterns from which the atomic structure of materials may be determined.

Diffraction apparatus utilizing radiation such as X-rays or a beam of electrons which strike or emanate from the specimen under test generally includes a photographic film which is exposed by the diffracted radiation, resulting in a photographic image or "pattern." This pattern, properly interpreted by means of measurements of the spacings and intensity of its ringlike or other elements, serves as an indication of the atomic structure of the tested material.

The measurements necessary for evaluating the characteristics of such patterns require not only extremely sensitive micrometric instruments, but also highly skilled technicians. Moreover, the measurement is time consuming and the accuracy obtained is governed by a number of factors such as the emulsion of the film, the mechanical precision of the instruments and last but not least, the human element which collects the data and thus evaluates the result. In other words, the photographic pattern obtained by diffraction apparatus of systems employed at present does not give a definite final result, but merely an intermediate step in a chain of measurements and calculations.

Attempts have been made to interpret diffraction images at approximately the time such images would be formed on a photographic plate or film, by exploring the radiation intensity variations with a photocell and marking the position of the exploring cell in one coordinate motion. In this manner an intensity versus diffraction angle curve may be traced by the operator resulting in a cross sectional picture of the conventional diffraction pattern. Here again mechanical inertia slows down the measurement process and the final result is not given by the apparatus per se, but is in the mind of the operator who evaluates the data furnished by the apparatus.

Diffraction of an X-ray beam or an electron beam in a particular specimen under analysis depends on the wave length, or in the case of electrons on the electron velocity, respectively. Consequently, for any measurement this factor must be held constant in order to operate in accordance with present day methods known in the art. This entails critical exciting and control voltages especially for electron diffraction apparatus since any variation encountered for a particular exposure would result in an uninterpretable pattern.

Equipment which furnishes these voltages, such as high voltage direct current power supplies, for the acceleration of the electron beam is generally bulky and costly due to the fact that elaborate ancillary devices are needed for maintaining constant values. It is to be noted here that the present invention eliminates this disadvantage completely.

The technique of electron diffraction in the present state of the art requires a photographic image or the analysis of the static electron pattern which would produce such an image. Both these methods call for a trans-radiation of the specimen by the beam and the emanation of diffracted radiation in the general direction of penetration. Considering these requirements certain practical limitations become apparent. One is that in most cases, the specimen to be analyzed must be of microscopic thickness in order to be pervious to radiation, otherwise an impractical amount of energy would have to be expended. None of these methods is adapted to back-reflection analysis of specimens—a method where neither thickness nor size of the specimen are limiting factors. It will be seen upon further consideration of this invention that the above disadvantage does not enter the problem.

A particular feature of this invention is that the diffraction apparatus constructed in accordance therewith can give instantaneously a true and quantitative characteristic pattern of the cross sectional type of the specimen under test. This pattern requires no evaluation nor any further mental process by the operator. Consequently, the operator need not be a highly skilled technician.

Another and equally important feature of the diffraction apparatus and system herein disclosed resides in its simplicity of component elements and their assembly, eliminating as before mentioned, all the costly, complicated and bulky power supplies, controls, mechanical as well as electrical accessories.

A particular advantage of the invention is that the diffraction apparatus is adapted without modification to the testing of various types of specimens within a wide range of investigation work.

Another advantage of the apparatus, in accordance with the invention, resides in its flexibility for back reflection analysis of specimens opaque to radiation as well as for the conventional analysis of penetrative radiation.

These and numerous other features and advantages will be apparent from the following description of the invention, pointed out in particularity in the appended claims and taken in connection with accompanying drawing in which:

Fig. 1 is a schematic cross sectional view of the diffraction electron gun and its associated circuit.

Fig. 2 shows the type of cross sectional pattern which the apparatus produces as an instantaneous visual indication, and Fig. 3 is a schematic circuit of an accessory apparatus for tracing specific patterns.

In diffraction analysis the problem is to produce an electron beam or a beam of radiation, for example a beam of X-rays of extremely small cross section and of wave length of the same order of magnitude as the distances separating the atoms of the materials to be examined. Consequently, the atomic or molecular arrangement becomes the diffraction grating which determines completely the diffraction properties of the system. The diffraction pattern obtained with a beam of suitable wave length will be dependent on the atomic or the molecular structure of the sample under analysis.

It is known that an electron of mass $m$ moving with velocity $v$ would have associated with it the wavelength $\lambda$, where $$\lambda = h/mv \quad (1)$$

and $h$ is the Planck constant. The acceleration imparted to an electron falling through an electric field $V_0 e \cos \phi$, where $\phi$ is the phase angle and $e$ is the charge of the electron, will lead to the velocity $v$ when $$V_0 e \cos \phi = \tfrac{1}{2} m v^2 \quad (2)$$

From (1) and (2) it is possible to evaluate a value for wavelength and to substitute it into the general Bragg law for diffraction, $\lambda = 2d \sin \theta$, as follows:

$$\frac{K}{\cos^{\frac{1}{2}} \phi} = d$$

where $$K = \frac{h}{2 \sin \theta (2 V_0 e m)^{\frac{1}{2}}} \quad (3)$$

The angle of diffraction is $2\theta$, $V_0$ represents peak voltage, and the other symbols have their usual significance.

Equation 3 gives the relationship between $\phi$, the phase angle for the accelerating voltage, and $d$, any interplanar spacing of the specimen under test and will be maintained for all different spacings since in accordance with this novel method the angle $2\theta$ is a fixed quantity.

On the basis of the above, it is seen that a great advantage and simplicity in the diffraction equipment may be obtained in departing from the established system of utilizing a beam of fixed velocity and instead producing one which has a continuously variable velocity and thereby a variable wave length and fixing the diffraction angle at a given value. For oscillographic observation a predetermined repetition rate of the beam velocity variation is also advantageous, as will be seen later. With a fixed diffraction angle $\theta$ only one value of accelerating voltage will correspond to any one interplanar spacing in a given range of beam velocity. Now, if at the chosen fixed diffraction angle, the diffraction interference is sensed by suitable apparatus, the resultant pattern may be directly indicated.

Briefly stated, the electron diffraction system of the present invention operates on the aforesaid principle in that means are provided for generating a beam of electrons and imparting a variable velocity to the electrons which impinge upon a specimen to be analyzed. The varying of the velocity is arranged within a predetermined range and in a predetermined time. Means are also provided for collecting the electrons diffracted from the specimen at the particularly chosen angle and indicating the presence of the collected electrons in a two dimensional pattern on an oscilloscope screen in which one dimension relates to the range of beam velocities and the other to the magnitude in the number of collected electrons.

Referring to the drawing in Fig. 1 the diffraction apparatus in the form of an electron gun is schematically shown comprising a housing 4 of longitudinal cross section, including at one end a cathode 5 which may be of the indirectly heated type and serves as the electron source. A filamentary heater 6 is shown having terminals brought out of the envelope 4 through suitable seals 7 and 8. The source of heating current for the filament is represented by way of example, by the battery 10, to which the terminals of the heater 6 are connected.

The structure of the electron gun may follow conventional design. For this reason, the conventional elements of the gun are merely indicated in a simplified manner, such as a cathode shield 11 and accelerating as well as collimating electrodes 12 and 13 having circular concentric apertures through which the collimated beam of electrons produced by the cathode 5 may pass.

In alignment with these electrodes there are provided two identical elements in the form of solid metallic housings 15 and 15' respectively, one in front of the test material 16 and the other behind it. Each of the housings 15 and 15' is provided with an angularly cut slit in the form of a ring 17 and 17' respectively, as well as a concentric aperture 18 and 18' for the passage of the electron beam. Inside of each housing, held by suitable means not shown here, is a collecting electrode 19 (and 19'), which may be in the form of a ring of conducting material having a concavely ground surface facing the slit 17 or 17'. The collecting electrode 19, as well as its counterpart 19' is insulated from the housings 15 or 15' and a connection is brought out from each collecting electrode through a suitable seal 20 or 20' to a switch 21. The connection for the collecting electrode 19 terminates at the switch contact 22, whereas that of 19', at the switch contact 23.

The test material 16 is held by a forked member 24 suspended from a cover plate 26 which is removable so that the material under test may be removed from the apparatus and another substituted. The holder, as well as the cover plate in the particular form shown here, are merely intended to illustrate one type of arrangement which may be used for securing the sample material in place for the test. Various other ways are equally satisfactory for this purpose, varying to some extent in accordance with the type of material to be investigated. An outlet pipe 27 is indicated for the connection of a vacuum pump which is generally employed for evacuating the electron gun assembly.

The high voltage necessary for accelerating the electrons and imparting to them the required velocity to strike the material 16 comprises a transformer 30 having a primary winding 31 which may be connected to a suitable alternating current source and a secondary winding 32. The terminals of the latter connect between the cathode 5, utilizing one side of the heater element supply, and the collector anode 33. The latter together with the high voltage terminal may be taken as the ground potential side of the system and is so indicated. A voltage divider 35 in shunt with the terminals of the secondary winding provides voltage taps for the collimating and accelerating electrodes 12 and 13. An adjustable tap on the potentiometer 37 furnishes the time axis oscilloscope voltage as will be explained later.

Connected to the system for the purpose of indicating a diffraction pattern directly is a conventional cathode ray oscilloscope shown in block diagram with the deflection plates schematically represented. The horizontal pair of plates connect between ground and the adjustable tap 37 and the vertical deflection plates between ground and the movable arm of the potentiometer 38 terminating at one end at the switch 21 and at the other end at the source of D. C. potential represented by the battery 39. The circuit energizing the vertical plates of the oscilloscope is also brought out to terminals A and B to which other equipment may be connected, as for example, an amplifying system shown in Fig. 3.

When the transformer 30 is energized, at each half cycle of the supply an electron beam is generated which in its path between cathode 5 and collector anode 33 encounters the test material 16. When this material is of such structure or of such thickness that the beam will penetrate it, electrons will be diffracted in both front and back directions. However, when the sample material is opaque to the electron beam at the velocities used, electrons will be diffracted only from the surface facing the collector element 19. This is termed back reflection. The diffraction of the electron beam for a particular sample will depend on the velocity of the beam and the structural nature of the sample. If we indicate the spacing of a set of diffracting planes by $d$, the following relationship may be formulated from the equations hereinbefore stated:

$$\lambda = 2d \sin \theta$$

when reflection occurs and since $$\lambda = \frac{h}{mv}; \quad V_0 e \cos \phi = \tfrac{1}{2}mv^2$$

$$\lambda = \frac{h}{\sqrt{2V_0 em \cos \phi}} = 2d \sin \theta$$

$$d = \frac{h}{2 \sin \theta \sqrt{2V_0 em \cos \phi}} = \frac{K}{\sqrt{V_0 \cos \phi}}$$

where $$K = \frac{h}{2 \sin \theta \sqrt{2em}} = \text{constant}$$

Therefore, if $\sin \theta$ is a constant, the interplanar separation $d$ will be determined by the relationship given, which is a fundamental precept in the system herein described.

Since the accelerating voltage is of an alternating or varying character, which is a salient feature of the invention, the beam velocity will be periodically changed. The electron wave length being a function of the beam velocity varies periodically also within a range of magnitudes. This variation occurs in the positive half cycle when the anode electrode 33 is positive with respect to the cathode 5 between zero and the peak value of the voltage. Now, if we provide a horizontal time axis potential for the cathode ray oscilloscope which is in proper phase with the alternating accelerating potential, we have a basis of representation in one co-ordinate. This is provided by the voltage derived from the variable tap of the potentiometer 37.

The indication in the second co-ordinate is obtained from the electrons diffracted from the specimen. If back reflection is used, the switch 21 is positioned to engage contact 22 and the electrons collected from the electrode 19 return to the grounded high potential terminal of the secondary winding 32, through the resistor 39 and the battery 38. The latter supplies the required bias potential for the electrodes 19 or 19'. On the other hand, if the test specimen is to be penetrated by the electron beam, and the diffracted electrons emanate from the other side of the specimen, the switch 21 is positioned to engage contact 23, and electron flow is derived from the collector electrode 19'.

The voltage produced due to the electron flow in the resistor 39 is impressed across the vertical deflection plates of the oscilloscope. Since the magnitude of this voltage depends on the number of electrons collected, the vertical component of the trace will indicate the diffraction intensity. The resultant pattern, typical of one particular specimen is seen in Fig. 2. It will be observed that for certain electron velocities equivalent to voltages $v_1$, $v_2$, $v_3$ and $v_4$, there are larger intensities due to diffraction produced by interplanar spacings in the sample. In view of the fact that these electron velocities occur only at particular points at each half cycle, one pattern and only one pattern, can be obtained from a given material.

The voltage peaks in the pattern shown in Fig. 2 represent the electron flow in the potentiometer 39 due to the electrons collected at certain velocities of the beam. The desired magnitude for observation may be adjusted by the arm of the potentiometer 39. The horizontal displacement as stated before, is produced from a portion of the secondary voltage of the transformer 30, whereby it is automatically synchronized. Obviously, since the accelerating voltage is alternating and effective at half cycles, there would ordinarily appear two identical patterns side by side as long as the horizontal trace represents one half cycle. However, only one set of conditions is sufficient for indication, such as that shown in Fig. 2, in which the duration of time is a quarter cycle. Various well known means may be used to co-ordinate the size of the horizontal trace with the time required to produce an accelerating voltage from zero to maximum peak in the diffraction tube. This is illustrated by the variable inductance 40 inserted in the horizontal deflection circuit. The function of the inductance 40 is to vary the phase of the time axis voltage with respect to the accelerating voltage and thereby in combination with the magnitude of the time axis voltage derived from the potentiometer 37 bringing into view any desired portion of the pattern. A vacuum tube with suitable cut off characteristics may also be employed in a type of gate circuit to control the horizontal deflection voltage.

While the time axis voltage derived from the transformer makes synchronization simple and automatic, it is also feasible to use a linear time axis having a saw tooth wave form, or any other desired type generated separately and synchronized with the accelerating voltage.

In place of the oscilloscope for visual observation of the pattern or in conjunction therewith as desired, a graphic recording apparatus may also be used. For this purpose, it is advantageous to use suitable amplifiers, including means which will actuate the recorder only by sudden surges. A schematic arrangement of components for recording is shown in Fig. 3. The surge actuation here is illustrated by a differentiating circuit, comprising the resistor 42 and the condenser 43 placed between two amplifiers. This will prevent the slight changes in total current flow associated with increase in peak voltage from noticeably affecting the recording, but will on the other hand, establish a strong but transient charge on the condenser when the peak voltage corresponds to conditions satisfying diffraction from an interplanar spacing. The magnitude of this charge will be representative of the efficiency of reflection from the particular set of planes responsible.

The movement of the record paper on the drum 45 engaging the stylus of the record head 46 is effected by the motor 47. Means should be provided to correlate this movement with the peak voltage of the diffraction unit. For this purpose there is shown a constant speed motor 47, for example a synchronous motor, which drives the drum 45. Excitation of the motor from a D. C. as well as an A. C. source is indicated by the terminals so marked. A variable voltage transformer 48 is coupled to the motor 47 of which the input terminals connect to an A. C. source as indicated and the output terminals 50 and 51 are to be connected to the primary winding 31 of the transformer 30 of Fig. 1. By this means the accelerating voltage rise and fall occurs in synchronism with the revolution of the drum 45.

The above illustrates one possible synchronizing arrangement. Various other means for synchronizing the drum movement may also be employed satisfactorily. For example a type where instead of the movement generating the accelerating voltage the latter actuates the displacement of the recording apparatus.

I claim:

1. Electron diffraction apparatus comprising means for generating a beam of electrons, means for imparting velocity to the electrons in said beam whereby to impinge upon a specimen to be analyzed, accelerator voltage means for varying the velocity of said electrons within a predetermined range of velocities and in a predetermined time, means for collecting the electrons diffracted from said specimen at certain of said velocities in said range and means for visually indicating the presence of said collected electrons.

2. Electron diffraction apparatus comprising means for generating a beam of electrons, means for imparting velocity to the electrons in said beam whereby to impinge upon a specimen to be analyzed, means for varying the velocity of said electrons within a predetermined range of velocities and in a predetermined time, means for collecting the electrons diffracted from said specimen at certain of said velocities in said range and means for visually indicating the presence of said collected electrons in a two dimensional pattern coincident in one dimension with said range of velocities and in another dimension with the magnitude in number of said collected electrons.

3. Electron diffraction apparatus comprising means for generating a beam of electrons, means for imparting velocity to said electrons whereby to impinge upon a specimen to be analyzed comprising a source of accelerating potentials, means for periodically changing the value of the potential of said source at a fixed rate thereby varying the velocity of said electrons, means for collecting the electrons diffracted from said specimen at certain of said velocities and means for visually indicating the presence of said collected electrons in a two dimensional pattern coincident in one dimension with the potential variation of said source and in another dimension with the magnitude in number of said collected electrons.

4. Electron diffraction apparatus comprising means for generating a beam of electrons, means for imparting velocity to the electrons in said beam whereby to impinge upon a specimen to be analyzed, means for varying the velocity and thereby the effective wave length of said electrons within a predetermined range of wave lengths, means for collecting the electrons diffracted from said specimen at certain of said wave lengths in said range and means for visually indicating the presence of said collected electrons in a two dimensional pattern coincident in one dimension with said range of wave lengths and in another dimension with the magnitude in number of said collected electrons.

5. Electron diffraction apparatus comprising means for generating a beam of electrons, means for imparting velocity to the electrons in said beam whereby to bombard a specimen to be analyzed, means for collecting the electrons reflected at a fixed angle from said specimen, means for recurrently varying the velocity of said electrons within a predetermined range of velocities and in a predetermined time, whereby the number of electrons reflected at said fixed angle of reflection is determined within said range by the structural composition of said specimen, means for visually indicating the presence of said reflected electrons simultaneously in a two dimensional pattern coincident in one dimension with said range of velocities and in another dimension with the magnitude in number of said collected electrons.

6. In an electron diffraction analyzing system, an electron gun having elements for generating and constraining a beam of electrons upon a specimen to be analyzed, said specimen being a target for said beam of electrons, means for varying the velocity of said beam comprising a source of accelerating potential for said electrons, said source being of an alternating character whereby said potential is varied between zero and a predetermined value in cyclic recurrence at a selected frequency, electron collector means in said gun positioned at a fixed angle for electrons diffracted from said target, means for indicating the diffraction interference pattern of said specimen, comprising a cathode ray oscilloscope having horizontal and vertical deflection elements, circuits for energizing one of said elements in accordance with said selected frequency and another of said elements in accordance with the magnitude in the number of electrons diffracted from said specimen.

7. In an electron diffraction analyzing system, an electron gun having elements for generating and constraining a beam of electrons upon a specimen to be analyzed, said specimen being a target for said beam of electrons, means for varying the velocity of said beam comprising a source of accelerating potential for said electrons, said source being of an alternating character whereby said potential is varied between zero and a predetermined value in cyclic recurrence at a selected frequency, electron collector means in said gun, positioned at a fixed angle for electrons diffracted from said target, means for indicating the diffraction interference pattern of said specimen, comprising a cathode ray oscilloscope having horizontal and vertical deflection elements, a circuit including a portion of said source for energizing one of said elements in accordance with said potential and a circuit including said collector means for energizing another of said elements in accordance with the magnitude in the number of electrons diffracted from said specimen.

8. In an electron diffraction analyzing system, an electron gun having elements for generating and constraining a beam of electrons upon a specimen to be analyzed, said specimen being a target for said beam of electrons, means for varying the velocity of said beam comprising a source of accelerating potential for said electrons, said source being of an alternating character whereby said potential is varied between zero and a predetermined value in cyclic recurrence at a selected frequency, electron collector means in said gun, positioned at a fixed angle behind said target for electrons penetrating said target, means for indicating the diffraction interference pattern of said specimen, comprising a cathode ray oscilloscope having horizontal and vertical deflection elements, a circuit for energizing one of said elements in accordance with said selected frequency and another of said elements in accordance with the magnitude in the number of electrons penetratingly diffracted from said target.

9. In an electron diffraction analyzing system, an electron gun having elements for generating and constraining a beam of electrons upon a specimen to be analyzed, said specimen being a target for said beam of electrons, means for varying the velocity of said beam comprising a source of accelerating potential for said electrons, said source being of an alternating character whereby said potential is varied between zero and a predetermined value in cyclic recurrence at a selected frequency, a pair of electron collector means in said gun, positioned at a fixed angle for electrons reflected from said target and for electrons penetrating said target, means for selectively indicating the diffraction interference pattern of said specimen from either one of said collector means comprising a cathode ray oscilloscope having horizontal and vertical deflection elements, a circuit for energizing one of said elements in accordance with said selected frequency and another of said elements selectively in accordance with the magnitude in the number of electrons collected by one of said collector means.

10. Electron diffraction apparatus in accordance with claim 3 where said visual indicating means includes a recording apparatus having a rotating element adapted to support a record, means engaging said record for tracing therein visual markings in accordance with the magnitude in the number of said collected electrons.

11. Electron diffraction apparatus in accordance with claim 3 where said visual indicating means includes a recording apparatus having a rotating element adapted to support a record, means engaging said record for tracing therein visual markings in accordance with the magnitude in the number of said collected electrons and said means for periodically changing said accelerating potential comprising a voltage controlling device operatively interconnected with said rotating element.

SIEGFRIED T. GROSS.

REFERENCES CITED

The following references are of record in the file of this patent:

UNITED STATES PATENTS

| Number | Name | Date |
| --- | --- | --- |
| 1,971,277 | Rupp | Aug. 21, 1934 |
| 2,439,644 | Bachman | Apr. 13, 1948 |